United States Patent Office 2,964,571
Patented Dec. 13, 1960

---

2,964,571

PROCESS OF PREPARING 2-ISOBUTYL-1,5-PENTANEDIOL

Kent C. Brannock, Kingsport, Tenn., assignor to Eastman Kodak Company, Rochester, N.Y., a corporation of New Jersey No Drawing. Filed Nov. 2, 1959, Ser. No. 850,041

2 Claims. (Cl. 260—635)

This invention relates to a process of making 2-alkyl-1,5-pentanediols, in which the alkyl group in the 2-position is a branched-chain group. This application is a continuation-in-part of my copending application Serial No. 742,740, filed June 18, 1958, now abandoned.

Paul and Tchelitscheff, Bull. soc. chim. France 1950, 1155–1159, showed condensing an acetal with dihydropyran in the presence of boron trifluoride to give a 2-alkoxy-3-(1-alkoxy alkyl) tetrahydropyran, which they hydrolyzed in the presence of HCl to give a 4-formyl-4-(1-alkoxy alkyl) butanol.

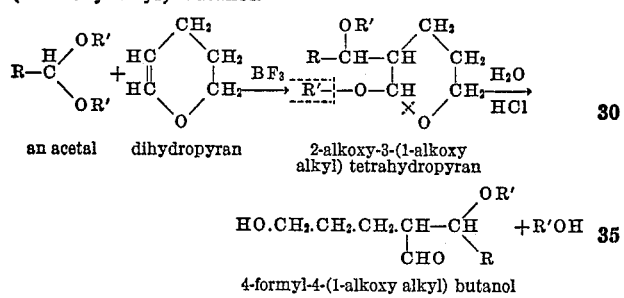

an acetal   dihydropyran   2-alkoxy-3-(1-alkoxy alkyl) tetrahydropyran $$HO.CH_2.CH_2.CH_2.CH-CH \begin{matrix} OR' \\ \backslash \\ R \end{matrix} + R'OH$$
$$\phantom{HO.CH_2.CH_2.CH_2.CH-}\underset{CHO}{|}$$

4-formyl-4-(1-alkoxy alkyl) butanol

R' may be an alkyl group of from 1 to 4 carbon atoms.
I have found that when R is

$R_1$ and $R_2$ being alkyl and $R_3$ being alkyl or hydrogen, the 2-alkoxy-3-(1-alkoxy alkyl) tetrahydropyran can be hydrolyzed with the loss of both —OR' groups by refluxing with acetic acid in the presence of a catalytic amount of an acid selected from the group consisting of mineral acids and strong organic acids having ionization constants of at least $1 \times 10^{-2}$, to give 2-alkenyl-5-acetoxy-valeraldehyde, which can be hydrogenated to the corresponding 2-alkyl-1,5-pentanediol monoacetate. Saponification of the 2-alkyl-1,5-pentanediol monoacetate gives 2-alkyl-1,5-pentanediol. Examples of acids suitable for use as catalysts in the hydrolysis are p-toluenesulfonic acid, benzenesulfonic acid, naphthalenesulfonic acid, sulfoacetic acid, sulfuric acid, sodium acid sulfate, potassium acid sulfate, phosphoric acid, oxalic acid, trifluoroacetic acid, trichloroacetic acid, dichloroacetic acid and the like.

My invention is illustrated, but not limited, by the following examples.

*Example 1.*—A mixture of 238 g. of 2-ethoxy-3-(1-ethoxy-2-methyl-propyl)tetrahydropyran (prepared by the method of Paul and Tchelitscheff from dihydropyran and isobutyraldehyde diethyl acetal), 240 g. of acetic acid, 50 ml. of benzene, and 0.3 g. of p-toluene sulfonic acid was refluxed under a Dean-Stark trap. No water was obtained until after 1¼ hours. By the end of 9½ hours, 37.5 ml. of water had been separated. The reaction mixture was poured slowly into a slurry of sodium bicarbonate in water to remove the excess acetic acid. The resulting mixture was extracted twice with 100 ml. portions of ethyl acetate, and the combined extracts were hydrogenated over Raney nickel for 12 hours at 1500 p.s.i. and 150° C. The catalyst was removed by filtration and the filtrate was distilled. After removal of the ethyl acetate there were obtained 26 g. of forerun, B.P. 45–65° C. at 3–4 mm., and 108.5 g. of crude 5-acetoxy-2-isobutyl-1-pentanol, B.P. 115° C. at 3 mm. to 135° C. at 5 mm. Hg pressure. Saponification of this compound by conventional means, followed by distillation, gave 71 g. of 2-isobutyl-1,5-pentanediol, B.P. 120° C. at 3 mm. to 132° C. at 4 mm., $n_D^{20}$ 1.4578.

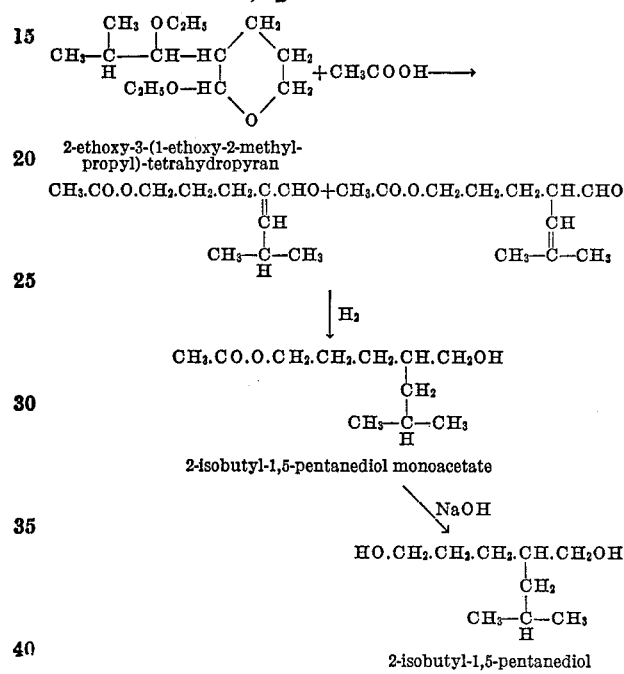

*Example 2.*—The process described in Example 1 was repeated, except that 0.1 g. of concentrated sulfuric acid was substituted for the 0.3 g. of p-toluenesulfonic acid. 37 ml. of water had been separated at the end of 8 hours. Workup as in Example 1 gave 64 g. of 2-isobutyl-1,5-pentanediol.

*Example 3.*—The process described in Example 1 was repeated, except that the catalyst used was 2 g. of potassium acid sulfate. 33 ml. of water was obtained after 20 hours, and workup gave 60 g. of 2-isobutyl-1,5-pentanediol.

*Example 4.*—Similarly, using 0.5 g. of oxalic acid as catalyst, 37 ml. of water was obtained in 12 hours, and workup gave 75 g. of 2-isobutyl-1,5-pentanediol.

*Example 5.*—Similarly, using 0.25 g. of trifluoroacetic acid as catalyst, 38 ml. of water was obtained after 8 hours, and workup gave 62 g. of 2-isobutyl-1,5-pentanediol.

The process is not operative when more than one of the groups $R_1$, $R_2$, $R_3$ is hydrogen. For example, an attempt to carry out the process using 2-ethoxy-3-(1-ethoxybutyl) tetrahydropyran, obtained from dihydropyran and n-butyraldehyde diethyl acetal, gave only high-boiling, viscous products from which no pure compounds could be separated.

The 2-alkyl-1,5-pentanediols are useful in the manufacture of plastic polyesters. Some of their carboxylic acid esters are useful as plasticizers and as synthetic lubricants.

I claim:

1. A process of preparing 2-isobutyl-1,5-pentanediol, which comprises hydrolyzing with acetic acid, in the presence of a catalytic amount of an acid selected from the group consisting of mineral acids and strong organic acids having ionization constants of at least $1 \times 10^{-2}$, 2-ethoxy-3-(1-ethoxy-2-methyl-propyl)tetrahydropyran, to give a mixture of 5-acetoxy-2-isobutenyl-n-valeraldehydes, hydrogenating the reaction product to give 2-isobutyl-1,5-pentanediol monoacetate, and saponifying the 2-isobutyl-1,5-pentanediol monoacetate.

2. A process of preparing 2-isobutyl-1,5-pentanediol, which comprises hydrolyzing with acetic acid, in the presence of a catalytic amount of p-toluenesulfonic acid, 2-ethoxy-3-(1-ethoxy-2-methylpropyl) tetrahydropyran, to give a mixture of 5-acetoxy-2-isobutenyl-n-valeraldehydes, hydrogenating the reaction product to give 2-isobutyl-1,5-pentanediol monoacetate, and saponifying the 2-isobutyl-1,5-pentanediol monoacetate.

No references cited.